United States Patent
Ho et al.

(10) Patent No.: US 9,797,534 B2
(45) Date of Patent: Oct. 24, 2017

(54) SPACE SAVING TELESCOPING PIPE TO TRANSPORT FLUID

(71) Applicant: GM Global Technology Operations LLC, Detroit, MI (US)

(72) Inventors: Li-Jen Peter Ho, Farmington Hills, MI (US); Steven M. Haar, White Lake, MI (US); Jeffrey J. Thomas, Mississauga (CA)

(73) Assignee: GM Global Technology Operations LLC, Detroit, MI (US)

( * ) Notice: Subject to any disclaimer, the term of this patent is extended or adjusted under 35 U.S.C. 154(b) by 144 days.

(21) Appl. No.: 14/136,361

(22) Filed: Dec. 20, 2013

(65) Prior Publication Data
US 2015/0176733 A1    Jun. 25, 2015

(51) Int. Cl.
| | |
|---|---|
| *F16L 21/02* | (2006.01) |
| *F16L 27/12* | (2006.01) |
| *F01M 5/00* | (2006.01) |
| *F01M 11/02* | (2006.01) |
| *F16L 37/088* | (2006.01) |
| *F01M 11/04* | (2006.01) |

(52) U.S. Cl.
CPC ............. *F16L 27/12* (2013.01); *F01M 5/002* (2013.01); *F01M 11/02* (2013.01); *F16L 37/088* (2013.01); *F01M 2011/0425* (2013.01)

(58) Field of Classification Search
CPC ....................................................... F16L 27/12
USPC ...... 285/7, 298, 302, 145.4, 145.1, 184, 369
See application file for complete search history.

(56) References Cited

U.S. PATENT DOCUMENTS

| | | | | | |
|---|---|---|---|---|---|
| 1,869,021 | A | * | 7/1932 | Perks | ............................ 277/625 |
| 2,829,909 | A | * | 4/1958 | Magnani | ............... F16L 21/022 |
| | | | | | 277/626 |
| 3,383,125 | A | * | 5/1968 | Frost et al. | ...................... 285/94 |
| 3,873,138 | A | * | 3/1975 | Griffiths | .................. F16L 21/08 |
| | | | | | 285/369 X |
| 4,066,281 | A | * | 1/1978 | De Bonis | ......................... 285/31 |
| 5,979,946 | A | * | 11/1999 | Petersen | ............... F16L 37/088 |
| | | | | | 285/143.1 |

FOREIGN PATENT DOCUMENTS

| | | |
|---|---|---|
| CN | 102032022 A | 4/2011 |
| JP | 1-188790 A * | 7/1989 |
| JP | 4-34288 A * | 2/1992 |
| WO | 0063540 A1 | 10/2000 |

OTHER PUBLICATIONS

General Motors Corporation, Engineering Standards, General Specification HVAC & PT Cooling, Transmission and Engine Oil Cooler Plumbing System, Feb. 2002.*

\* cited by examiner

*Primary Examiner* — Gregory Binda
(74) *Attorney, Agent, or Firm* — BrooksGroup

(57) ABSTRACT

One variation may include a telescoping pipe comprising: a first pipe and a second pipe, wherein the second pipe is constructed and arranged to stretch and retract along the first pipe so that a length of the telescoping pipe can be extended or shortened; a first O-ring coupled between the first pipe and the second pipe; and a second O-ring coupled to an inner surface of the second pipe.

14 Claims, 4 Drawing Sheets

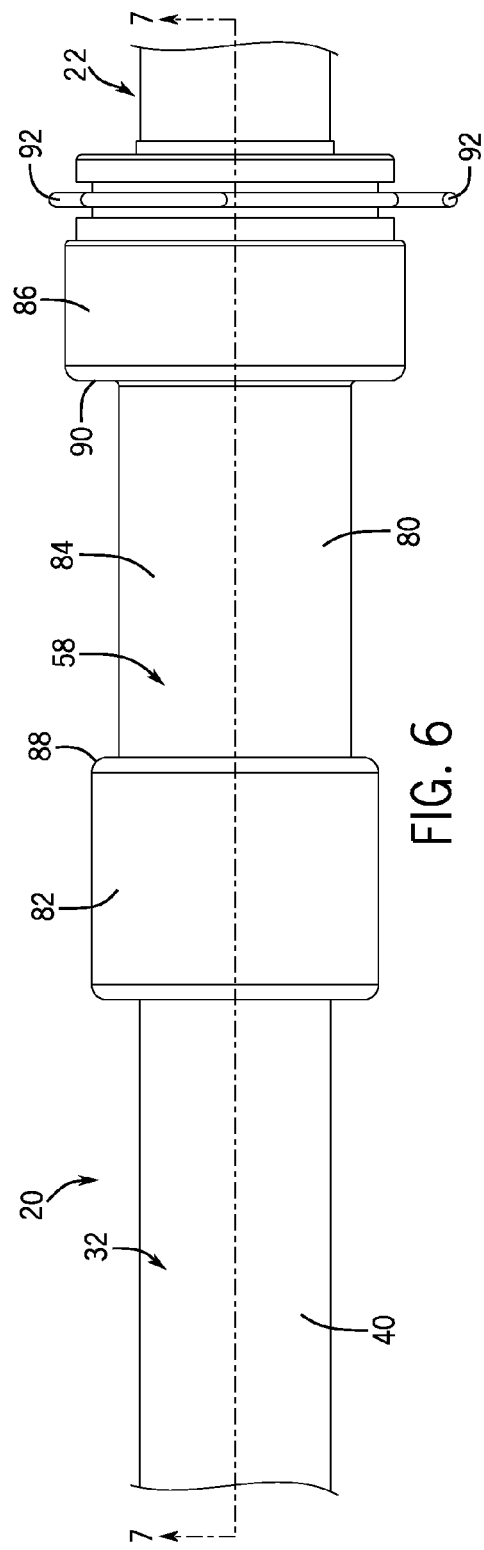
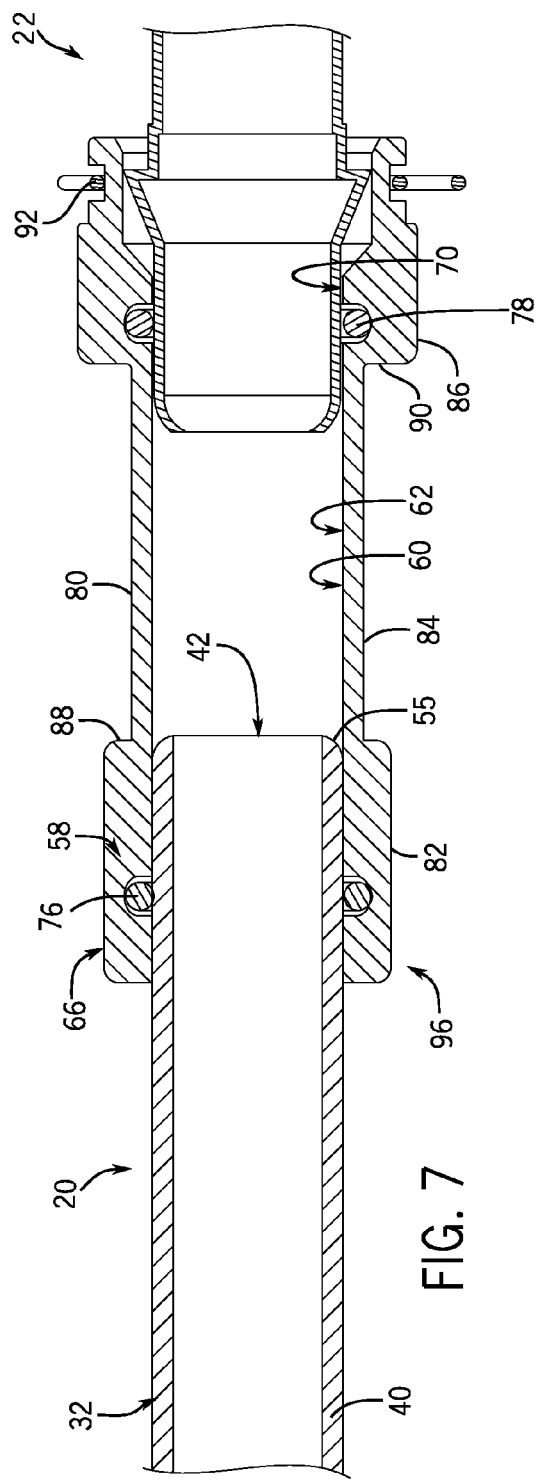

SPACE SAVING TELESCOPING PIPE TO TRANSPORT FLUID

TECHNICAL FIELD

The field to which the disclosure generally relates to includes pipes.

BACKGROUND

A pipe may be used to transport fluid.

SUMMARY OF ILLUSTRATIVE VARIATIONS

One variation may include a product comprising: a telescoping pipe comprising: a first pipe and a second pipe, wherein the second pipe is slideably coupled to the first pipe; a first O-ring coupled between the first pipe and the second pipe; and a second O-ring coupled to an inner surface of the second pipe.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 6 illustrates a side view of a variation of a mating component inserted into a telescoping pipe.

FIG. 7 illustrates a sectional view of a variation of a mating component inserted into a telescoping pipe.

DETAILED DESCRIPTION OF ILLUSTRATIVE VARIATIONS

The following description of the variations is merely illustrative in nature and is in no way intended to limit the scope of the invention, its application, or uses.

In any number of variations, a telescoping pipe 20 may be used to transport fluid including, but not limited to, oil, air, water, engine coolant, windshield washer fluid, brake fluid, gasoline, diesel, and/or gas. In a number of variations, the telescoping pipe 20 may be extended or stretched which may increase the length, or it may be retracted which may shorten the length. This may allow use of a telescoping pipe 20 on a wide range of applications with varying tolerances.

Figure 1:
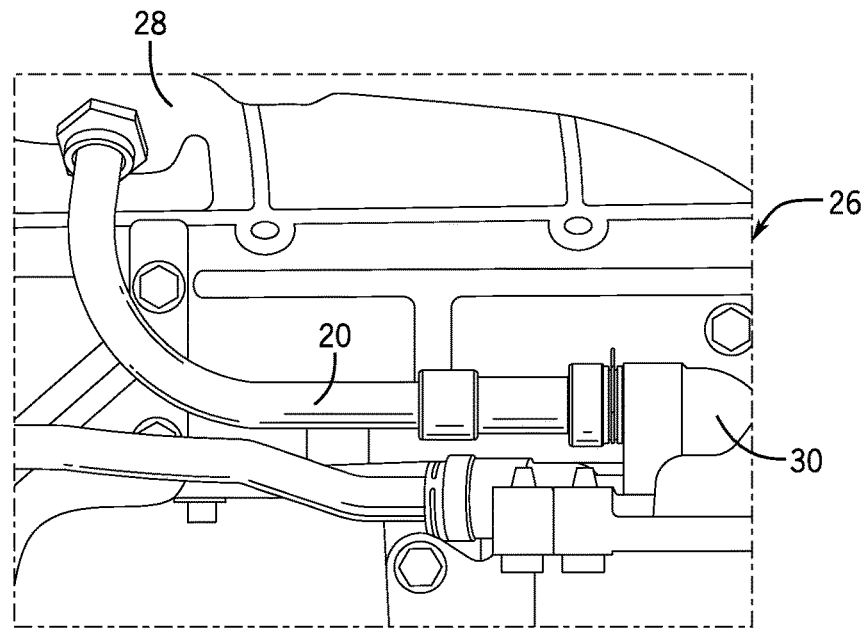
FIG. 1 illustrates a prospective view of a pipe in an engine assembly according to a number of variations.
Figure 2:
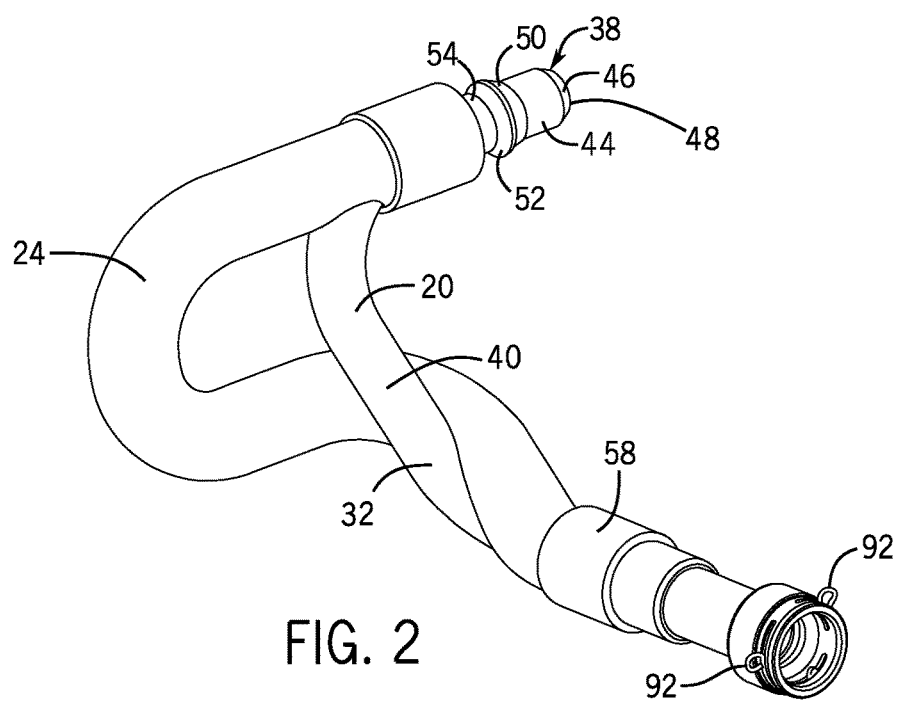
FIG. 2 illustrates a prospective view of a traditional pipe routing and a telescoping pipe routing according to a number of variations.
Figure 3:
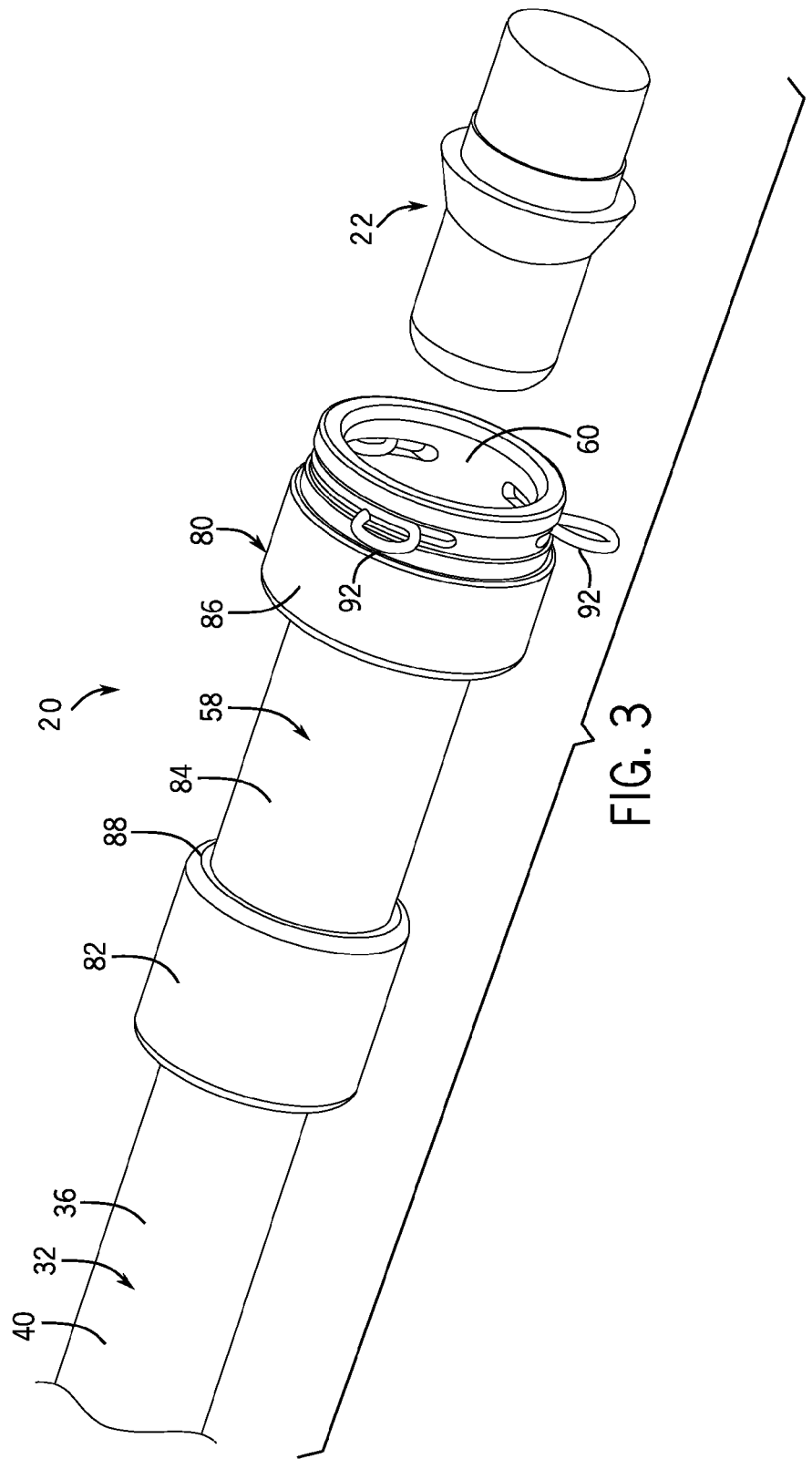
FIG. 3 illustrates a prospective view of a telescoping pipe and a mating component according to a number of variations.

Referring to FIGS. 1-2, a telescoping pipe 20 may be used in any number of applications including, but not limited to, any of a number of engine systems 26, to transport fluid. In one variation, a telescoping pipe 20 may be used to transport fluid from the engine block 28 to the oil cooler 30. In any number of variations, the packaging space in an engine system 26 may be limited and the routing of a traditional hose or pipe 24, for example as illustrated in FIG. 2, may create a condition where the traditional pipe 24 may interfere with any of a number of engine components and may make installation of the traditional pipe 24 into the engine system 26 difficult. In any number of variations, a telescoping pipe 20 may be routed so that it takes up less packaging space than a traditional hose or pipe 24, for example as illustrated in FIG. 2. The use of a telescoping pipe 20 may also make installation easier as the length of the telescoping pipe 20 may be adjusted to meet a range of tolerances.

Referring to FIGS. 2-7, in any number of variations, a telescoping pipe 20 may comprise a first pipe 32 and a second pipe 58. The second pipe 58 may include a larger diameter than the first pipe 32 and may be shorter in length than the first pipe 32. In a number of variations, the second pipe 58 may be slideably attached to the first pipe 32.

Figure 4:
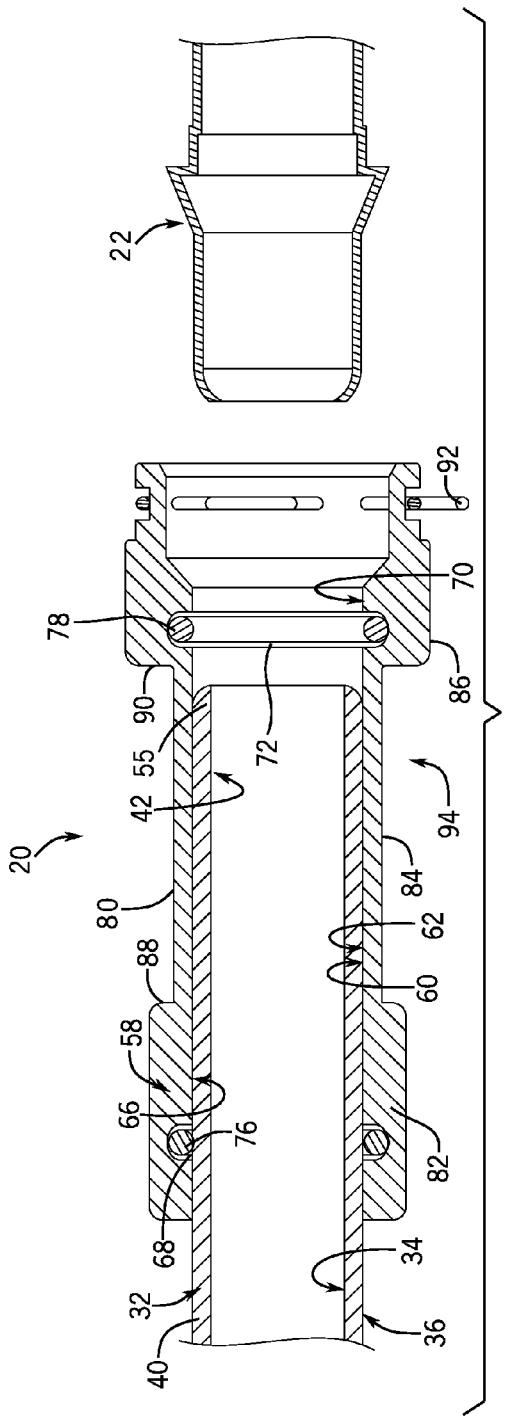
FIG. 4 illustrates a sectional view of a variation of a telescoping pipe and a mating component.
Figure 5:
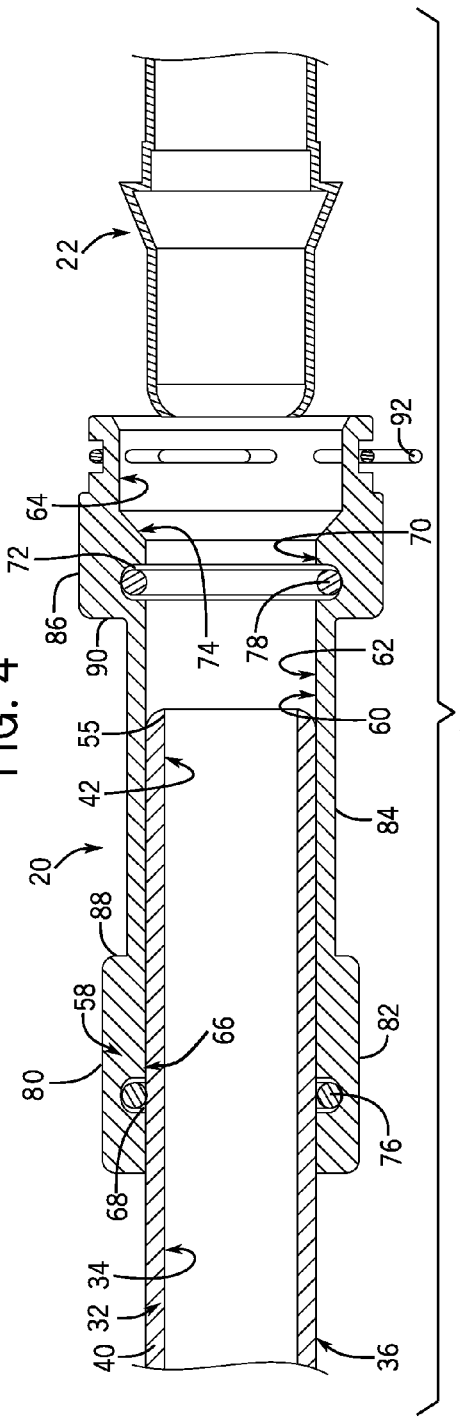
FIG. 5 illustrates a sectional view of a telescoping pipe and a mating component according to a number of variations.

In any number of variations, the first pipe 32 may comprise a first end 38 (best illustrated in FIG. 2), a body 40, and a second end 42, and may include an inner surface 34 and an outer surface 36, for example as illustrated in FIGS. 4 and 5. In any number of variations, a first end 38 may be constructed and arranged to mate with any of a number of mating components 22 including, but not limited to, a connector or a pipe. In one variation, the first end 38 may comprise a first cylindrical surface 44, a second cylindrical surface 54, and a lip 52 extending therebetween, for example as illustrated in FIG. 2. The first cylindrical surface 44 may include an inward taper 46 at its front end 48. The first cylindrical surface 44 may extend to a tapered or formed out portion 50 which may extend to the lip 52. The body 40 may extend between the first end 38 to the second end 42 of the first pipe 32. The second end 42 may include a taper 55 inward, for example as illustrated in FIGS. 4 and 5.

Referring to FIG. 5, in a number of variations, a second pipe 58 may include an inner surface 60 and an outer surface 80. The inner surface 60 may include a first inner cylindrical surface 62 and a second inner cylindrical surface 64. The first inner cylindrical surface 62 may be constructed and arranged to slideably attach to the second end 42 of the first pipe 32. A first end 66 of the first inner cylindrical surface 62 may include a first radial cutout 68 and a second end 70 of the first cylindrical surface 62 may include a second radial cutout 72. The first radial cutout 68 may be constructed and arranged to accommodate a first radial seal or O-ring 76 and the second radial cutout 72 may be constructed and arranged to accommodate a second radial seal or O-ring 78. The second end 70 of the first inner cylindrical surface 62 may also include a tapered surface 74 which may extend toward the second inner cylindrical surface 64, for example as illustrated in FIG. 5. In any number of variations, the second inner cylindrical surface 64 may be constructed and arranged to mate with any of a number of mating components 22 including, but not limited to, a connector or a pipe.

The outer surface 80 of the second pipe 58 may comprise a first outer cylindrical surface 82, a second outer cylindrical surface 84, and a third outer cylindrical surface 86. A first lip 88 may extend approximately vertical between the first outer cylindrical surface 82 and the second outer cylindrical surface 84. A second lip 90 may extend approximately vertical between the second outer cylindrical surface 84 and the third outer cylindrical surface 86. The diameter of the third outer cylindrical surface 86 may be larger than the first and second cylindrical surfaces 82, 84. The first outer cylindrical surface 82 may be greater than the second outer cylindrical surface 84. The third outer cylindrical surface 86 may also include one or more locking features 92, including, but not limited to, loops or barbs, for example as illustrated in FIGS. 4 and 5, which may be used to lock the telescoping pipe 20 to a mating pipe or component 22.

A telescoping pipe 20 may comprise any of a number of materials including, but not limited to, aluminum, plastic, steel, copper, or brass.

Referring to FIGS. 4, 5, and 7, in a number of variations, a first O-ring 76 may be located inside of the first radial cutout 68 in the first end 66 of the first inner cylindrical surface 62. A second O-ring 78 may be located inside of the second radial cutout 72 in the second end 70 of the first inner cylindrical surface 62. The first O-ring 76 may be constructed and arranged to seal the second end 42 of the first pipe 32 with the first inner cylindrical surface 62 of the second pipe 58. The second O-ring 78 may be constructed and arranged to seal a mating component 22 to the first inner cylindrical surface 62 of the second pipe 58, for example as illustrated in FIG. 7.

In any number of variations, the second pipe 58 may be retracted 94 which may shorten the telescoping pipe 20 length, for example as illustrated in FIG. 4, or stretched 96 which may lengthen the telescoping pipe 20, for example as illustrated in FIG. 7, or may be any length therebetween. This may allow for the use of the telescoping pipe 20 in applications which include varying tolerances. In a number of variations, the first O-ring 76 may seal the first pipe 32 to the second pipe 58 when the second pipe 58 is fully retracted, fully stretched, or in any position therebetween. The sealing of the first pipe 32 and the second pipe 58 with the use of the first O-ring 76 may provide additional thermal protection.

In any number of variations, a telescoping pipe 20 may be attached to a mating component 22 which may include, but is not limited to a connector or a pipe. In a quick connection variation, the second pipe 58 may be stretched to connect to a mating component 22, for example as illustrated in FIGS. 6 and 7. The mating component 22 may be held into place by one or more locking features 92 on the telescoping pipe 20. The mating component 22 may then be sealed with the second end 70 of the first cylindrical surface 62 of the telescoping pipe 20 by the second O-ring 78 which may provide additional thermal protection. In a number of variations, a telescoping pipe 20 may include any number of connecting means to connect to a mating component 22 including, but not limited to, a quick connection feature (as illustrated in FIG. 2), crimp connection, glue connection, threaded connection, soldered connection, and/or compressing connection.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a telescoping pipe comprising: a first pipe and a second pipe, wherein the second pipe is slideably coupled to the first pipe; a first O-ring coupled between the first pipe and the second pipe; and a second O-ring coupled to an inner surface of the second pipe.

Variation 2 may include a product as set forth in Variation 1 wherein the second pipe includes a first radial cutout and a second radial cutout and wherein the first radial cutout is constructed and arranged to accommodate the first O-ring and the second radial cutout is constructed and arranged to accommodate the second O-ring.

Variation 3 may include a product as set forth in any of Variations 1-2 wherein the first O-ring is constructed and arranged to seal the first pipe with the second pipe.

Variation 4 may include a product as set forth in any of Variations 1-3 wherein the second O-ring is constructed and arranged to seal the second pipe with a mating component.

Variation 5 may include a product as set forth in any of Variations 1-4 wherein the telescoping pipe is constructed and arranged to transport a fluid.

Variation 6 may include a product as set forth in any of Variations 1-5 wherein the fluid comprises oil.

Variation 7 may include a product as set forth in any of Variations 1-6 wherein the second pipe is constructed and arranged to retract and stretch along the first pipe.

Variation 8 may include a product as set forth in any of Variations 1-7 wherein the second end of the telescoping pipe includes one or more locking features.

Variation 9 may include a product as set forth in any of Variations 1-8 wherein the one or more locking features are constructed and arranged to lock the telescoping pipe to a mating component.

Variation 10 may include a product as set forth in any of Variations 1-9 wherein the first pipe has a greater length than the second pipe.

Variation 11 may include a product as set forth in any of Variations 1-10 wherein the first pipe comprises a first end, a body, a second end, an inner surface, and an outer surface, wherein the first end comprises a first cylindrical surface, a second cylindrical surface, a tapered surface, and a lip extending between the tapered surface and the second cylindrical surface.

Variation 12 may include a product as set forth in any of Variations 1-11 wherein the first end includes an inward taper.

Variation 13 may include a product as set forth in any of Variations 1-12 wherein the second end includes an inward taper.

Variation 14 may include a product as set forth in any of Variations 1-13 wherein the second pipe includes a first end, a second end, an inner surface, and an outer surface; wherein the inner surface includes a first inner cylindrical surface and a second inner cylindrical surface; and wherein a first end of the first inner cylindrical surface includes the first radial cutout and a second end of the first cylindrical surface includes the second radial cutout.

Variation 15 may include a product as set forth in any of Variations 1-14 wherein the second end of the inner surface includes a tapered surface which extends toward the second inner cylindrical surface.

Variation 16 may include a product as set forth in any of Variations 1-15 wherein the outer surface comprises a first outer cylindrical surface, a second outer cylindrical surface, and a third outer cylindrical surface, wherein a first lip extends approximately vertical between the first outer cylindrical surface and the second outer cylindrical surface and a second lip extends approximately vertical between the second outer cylindrical surface and the third outer cylindrical surface.

Variation 17 may include a product as set forth in any of Variations 1-16 wherein the diameter of the third outer cylindrical surface is larger than the first and second cylindrical surfaces and the first outer cylindrical surface is greater than the second outer cylindrical surface.

Variation 18 may include a product as set forth in any of Variations 1-17 further comprising an engine block and an oil cooler, wherein the telescoping pipe transports fluid from the engine block to the oil cooler.

Variation 19 may include a product as set forth in any of Variations 1-18 wherein the telescoping pipe comprises aluminum.

The above description of select variations within the scope of the invention is merely illustrative in nature and, thus, variations or variants thereof are not to be regarded as a departure from the spirit and scope of the invention.

What is claimed is:

1. A telescoping pipe comprising:
    a first pipe and a second pipe, wherein the second pipe is constructed and arranged to stretch and retract along the first pipe so that a length of the telescoping pipe can be extended or shortened;
    a first O-ring coupled between the first pipe and the second pipe;
    a second O-ring coupled to an inner surface of the second pipe;
    wherein the second pipe includes a first radial cutout at a first end of the second pipe and a second radial cutout at a second end of the second pipe, wherein the first radial cutout is constructed and arranged to accommodate the first O-ring and the second radial cutout is constructed and arranged to accommodate the second O-ring, wherein the second O-ring is constructed and arranged to seal the second pipe with a mating component;
    wherein the first pipe has a greater length than the second pipe; and
    wherein the telescoping pipe includes a first end and a second end, and wherein the second end of the telescoping pipe includes one or more locking features.

2. The telescoping pipe of claim 1 wherein the first O-ring is constructed and arranged to seal the first pipe with the second pipe.

3. The telescoping pipe of claim 1 wherein the telescoping pipe is constructed and arranged to transport a fluid.

4. The telescoping pipe of claim 1 wherein the one or more locking features are constructed and arranged to lock the telescoping pipe to a mating component.

5. The telescoping pipe of claim 1 further comprising an engine block and an oil cooler, wherein the telescoping pipe transports fluid from the engine block to the oil cooler.

6. The telescoping pipe of claim 5 wherein the second end of the telescoping pipe is locked onto the oil cooler.

7. The telescoping pipe of claim 1 wherein the telescoping pipe comprises aluminum.

8. A telescoping pipe comprising:
    a first pipe and a second pipe, wherein the second pipe is constructed and arranged to stretch and retract along the first pipe so that a length of the telescoping pipe can be extended or shortened;
    a first O-ring coupled between the first pipe and the second pipe;
    a second O-ring coupled to an inner surface of the second pipe;
    wherein the first pipe comprises a first end, a body, a second end, an inner surface, and an outer surface, wherein the first end comprises a first cylindrical surface, a second cylindrical surface, a tapered surface, and a lip extending between the tapered surface and the second cylindrical surface;
    wherein the second pipe includes a first radial cutout at a first end of the second pipe and a second radial cutout at a second end of the second pipe, wherein the first radial cutout is constructed and arranged to accommodate the first O-ring and the second radial cutout is constructed and arranged to accommodate the second O-ring;
    wherein the first pipe has a greater length than the second pipe; and
    wherein the telescoping pipe includes a first end and a second end, and wherein the second end of the telescoping pipe includes one or more locking features.

9. The telescoping pipe of claim 8 wherein the first end includes an inward taper.

10. The telescoping pipe of claim 8 wherein the second end includes an inward taper.

11. The telescoping pipe of claim 8 wherein the second pipe includes an inner surface and an outer surface;
    wherein the inner surface of the second pipe includes a first inner cylindrical surface and a second inner cylindrical surface; and
    wherein the first radial cutout and the second radial cutout are in the first inner cylindrical surface.

12. The telescoping pipe of claim 11 wherein the second end of the second pipe includes a tapered surface which extends toward the second inner cylindrical surface.

13. The telescoping pipe of claim 11 wherein the outer surface comprises a first outer cylindrical surface, a second outer cylindrical surface, and a third outer cylindrical surface, wherein a first lip extends approximately perpendicular to a central axis of the second pipe between the first outer cylindrical surface and the second outer cylindrical surface and a second lip extends approximately perpendicular to a central axis of the second pipe between the second outer cylindrical surface and the third outer cylindrical surface.

14. The telescoping pipe of claim 13 wherein the diameter of the third outer cylindrical surface is larger than the first and second cylindrical surfaces and the first outer cylindrical surface is greater than the second outer cylindrical surface.

* * * * *